Feb. 15, 1944.   T. M. HAGENBOOK   2,341,545
ELECTRICALLY CONTROLLED OPERATING SYSTEM FOR REVOLVING DOORS
Filed Nov. 6, 1940   11 Sheets-Sheet 1
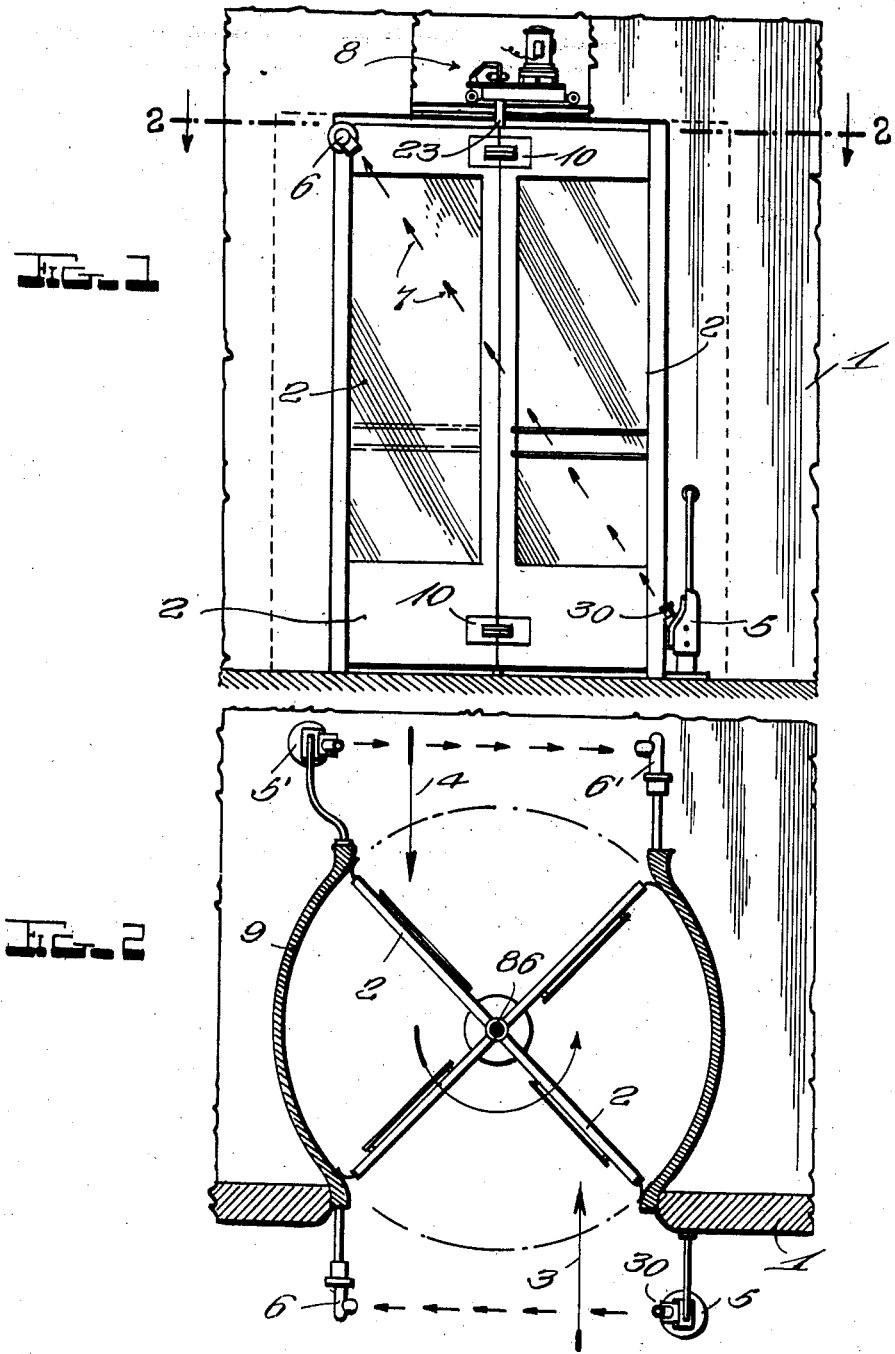
INVENTOR.
Thurlos M. Hagenbook,
BY
John B. Brady
Attorney

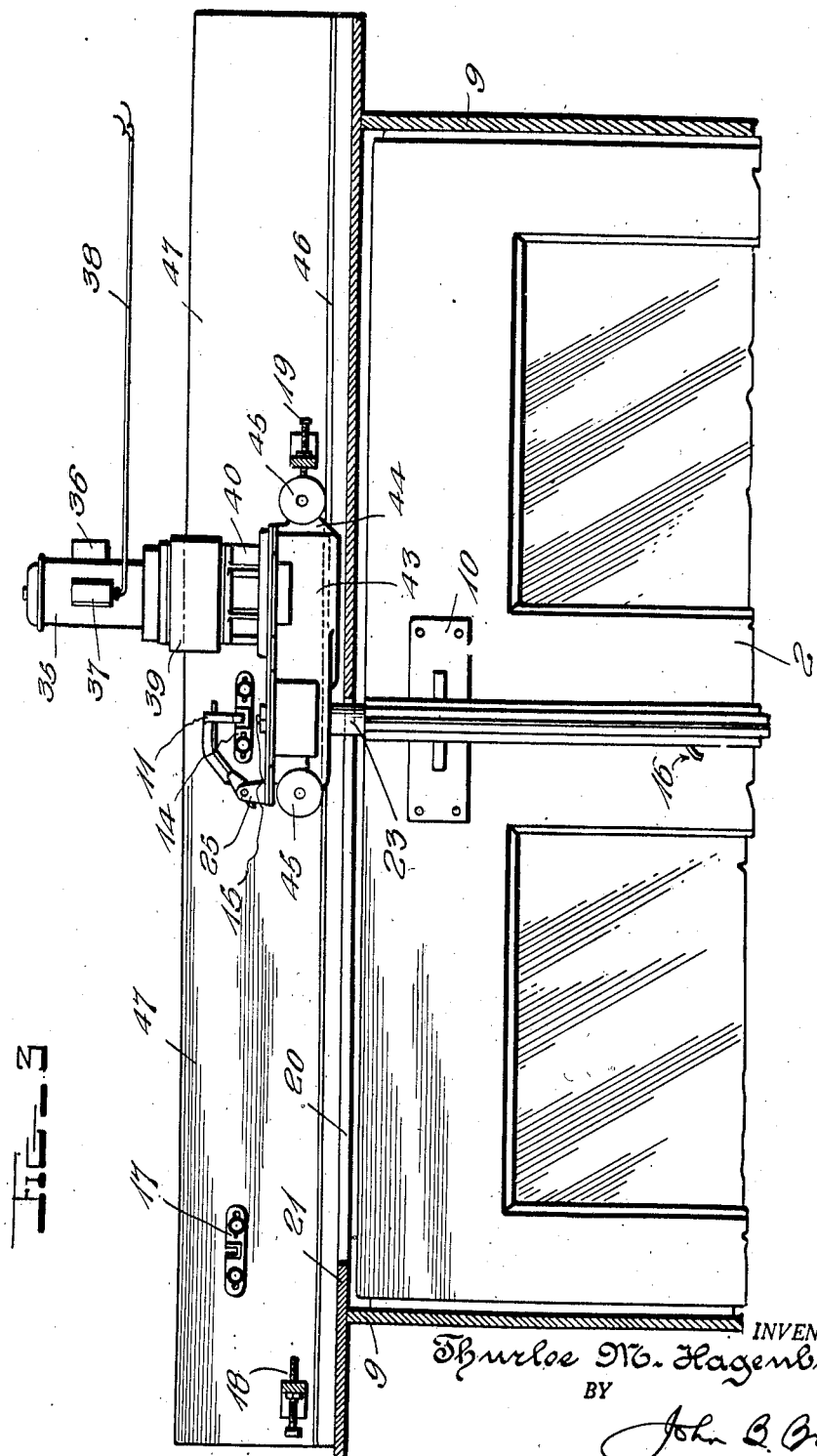

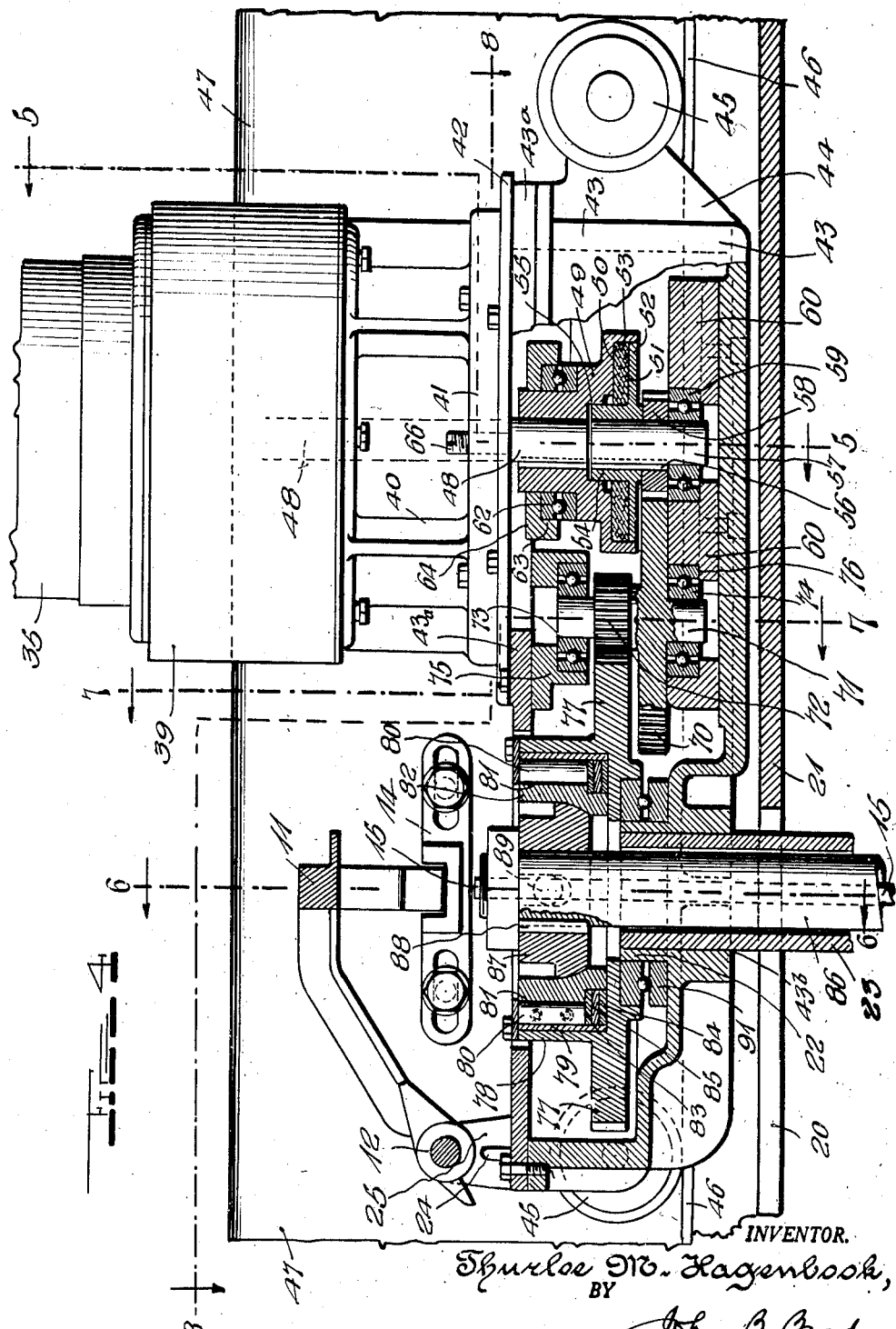

Feb. 15, 1944. T. M. HAGENBOOK 2,341,545
ELECTRICALLY CONTROLLED OPERATING SYSTEM FOR REVOLVING DOORS
Filed Nov. 6, 1940 11 Sheets-Sheet 4
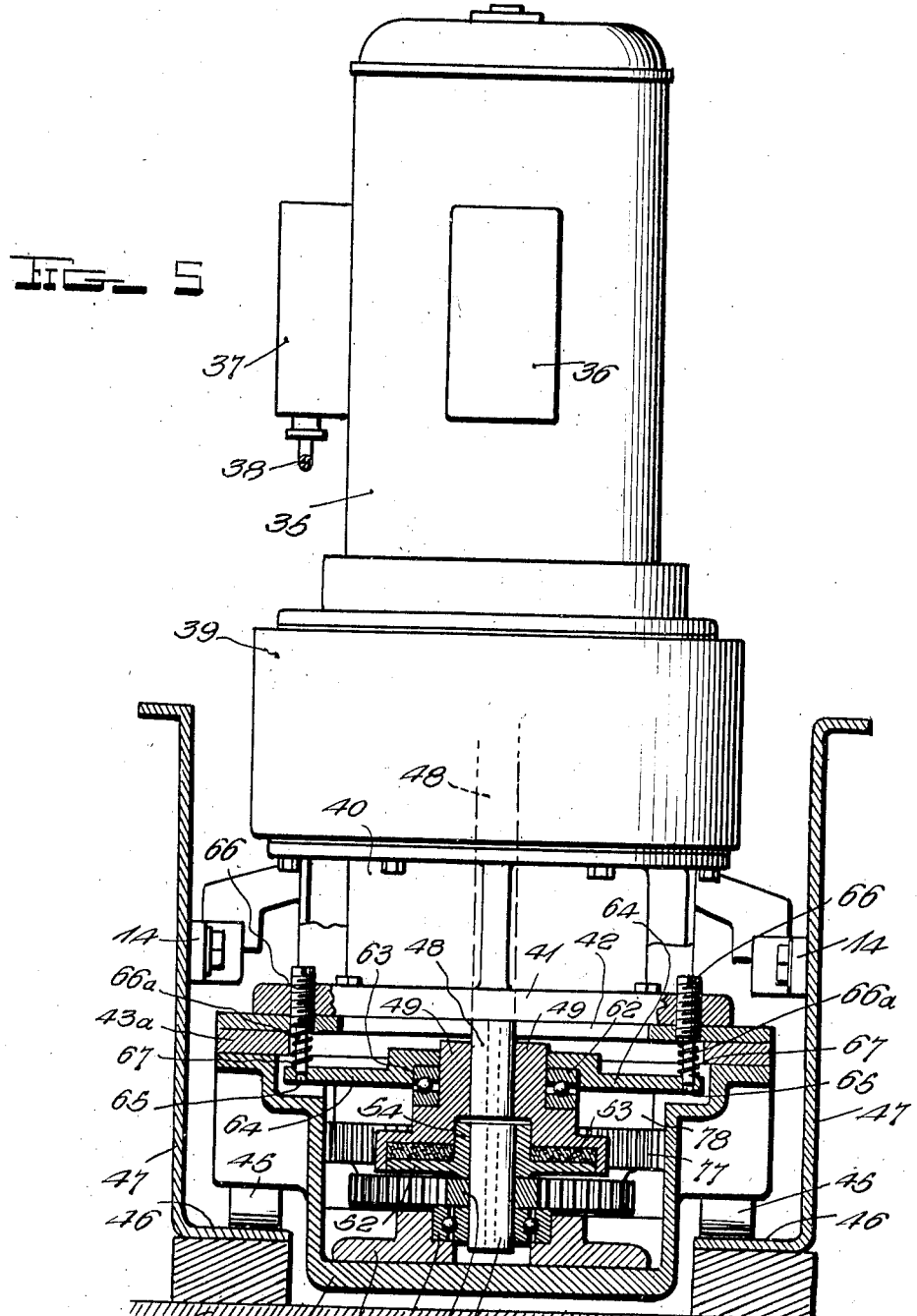
INVENTOR.
Thurloe M. Hagenbook,
BY
John B. Brady
Attorney

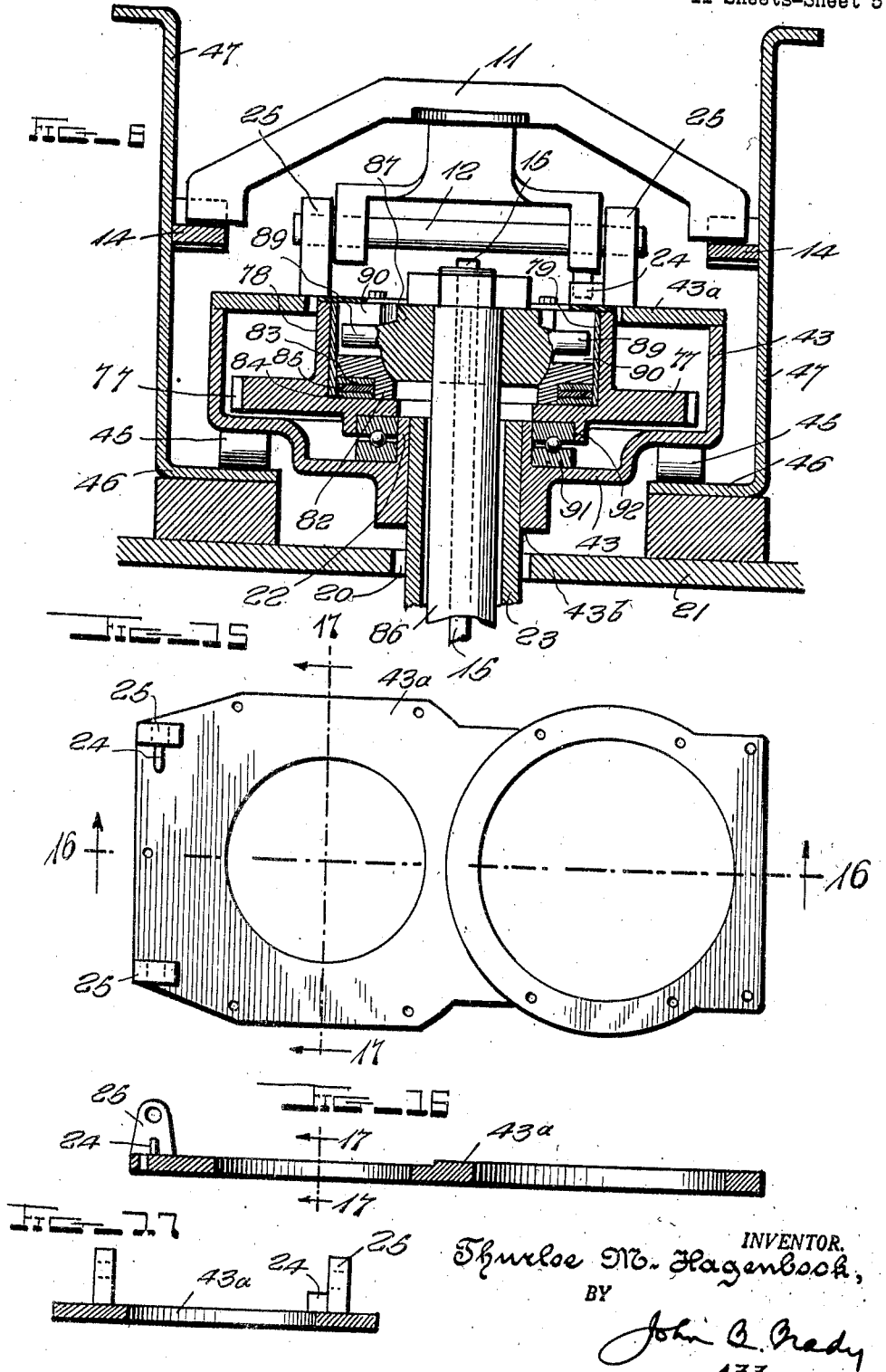

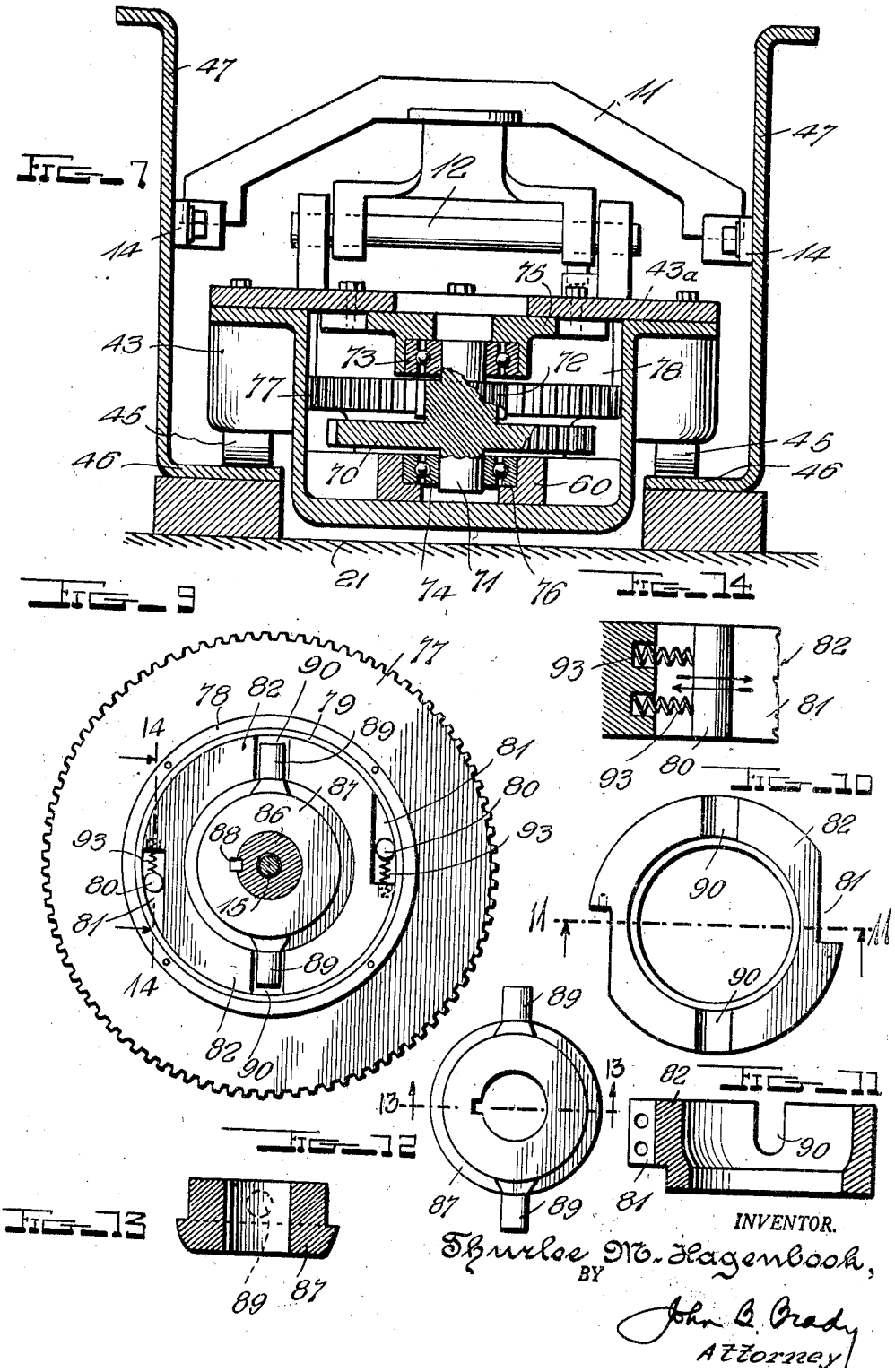

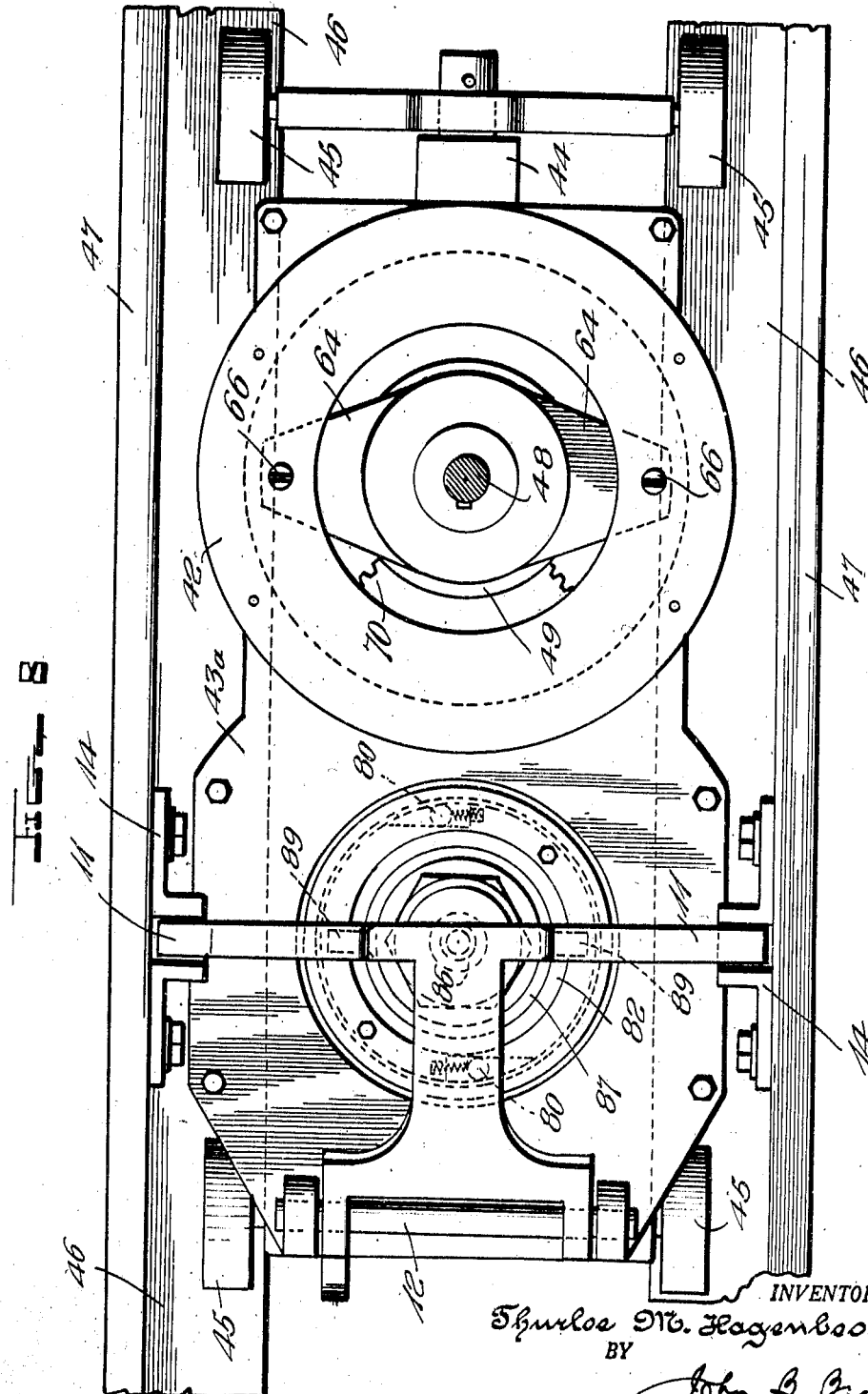

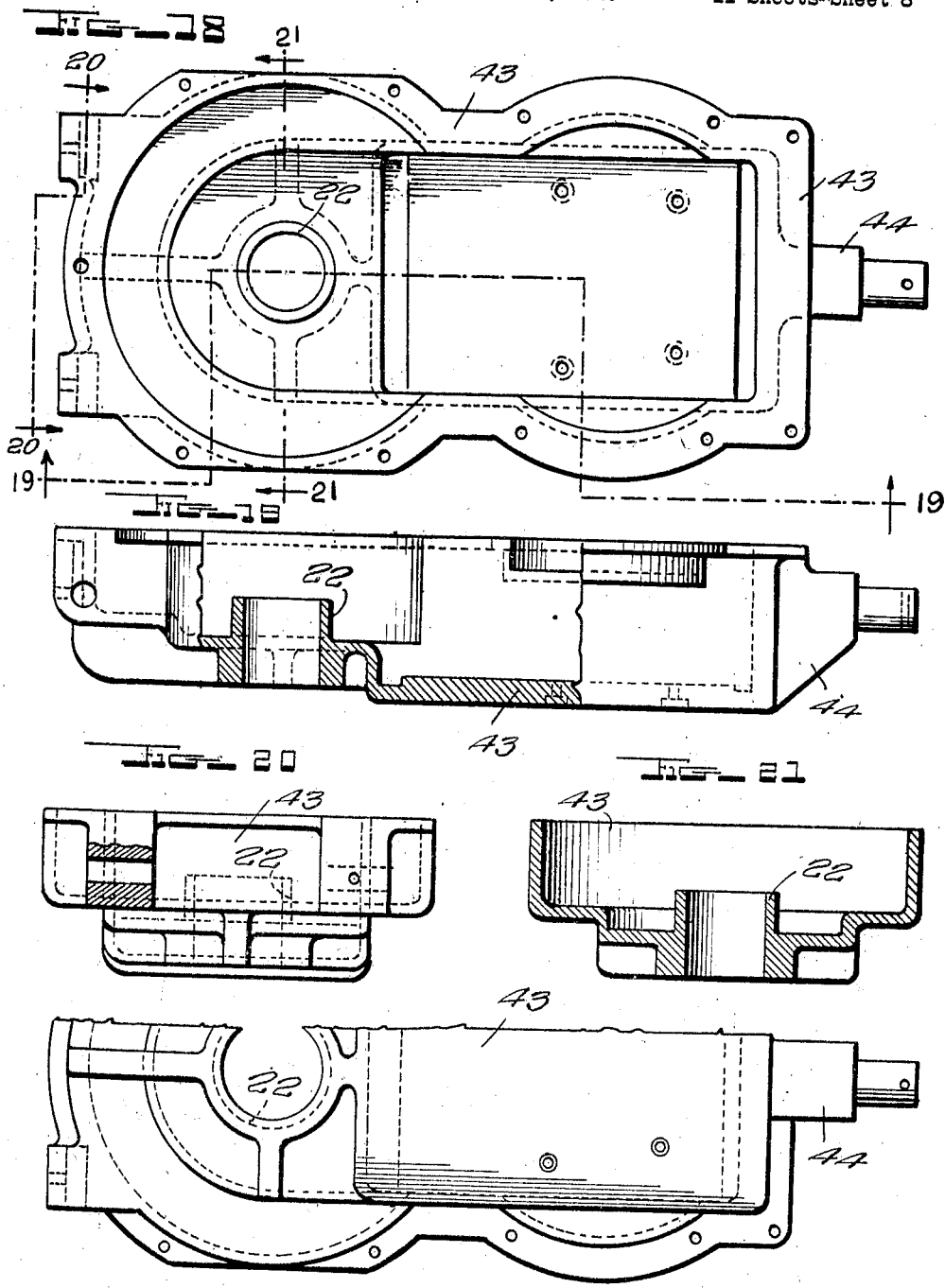

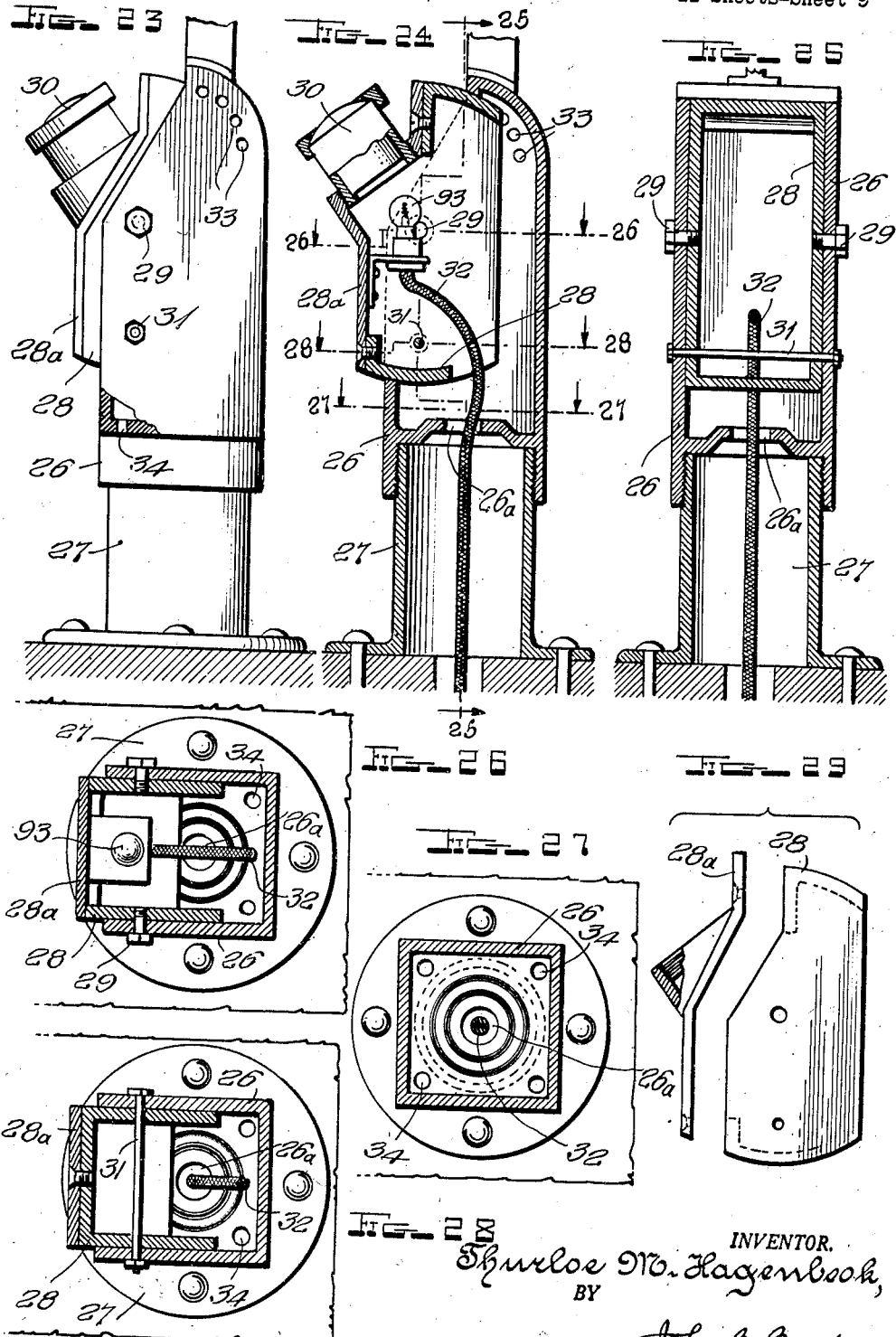

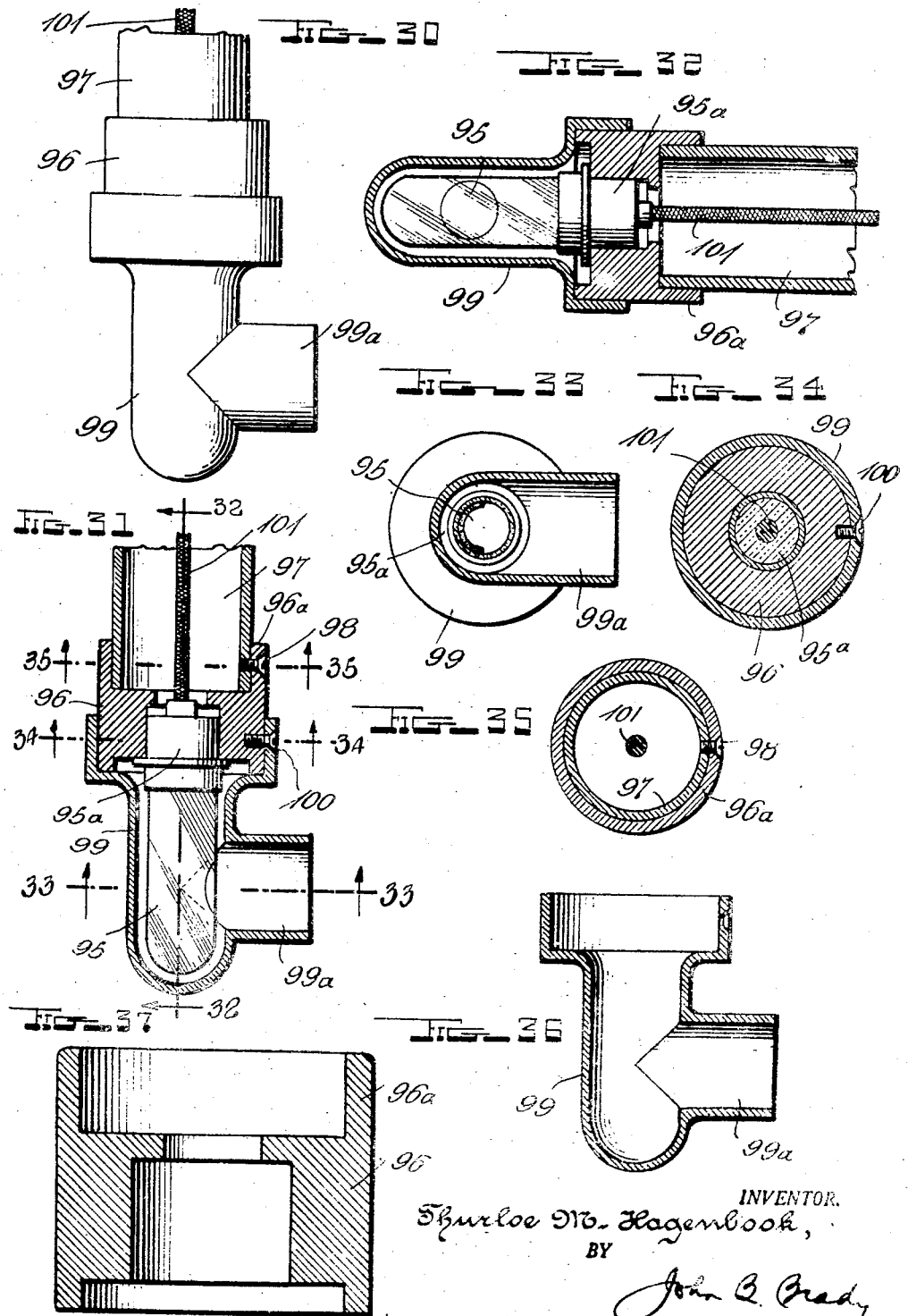

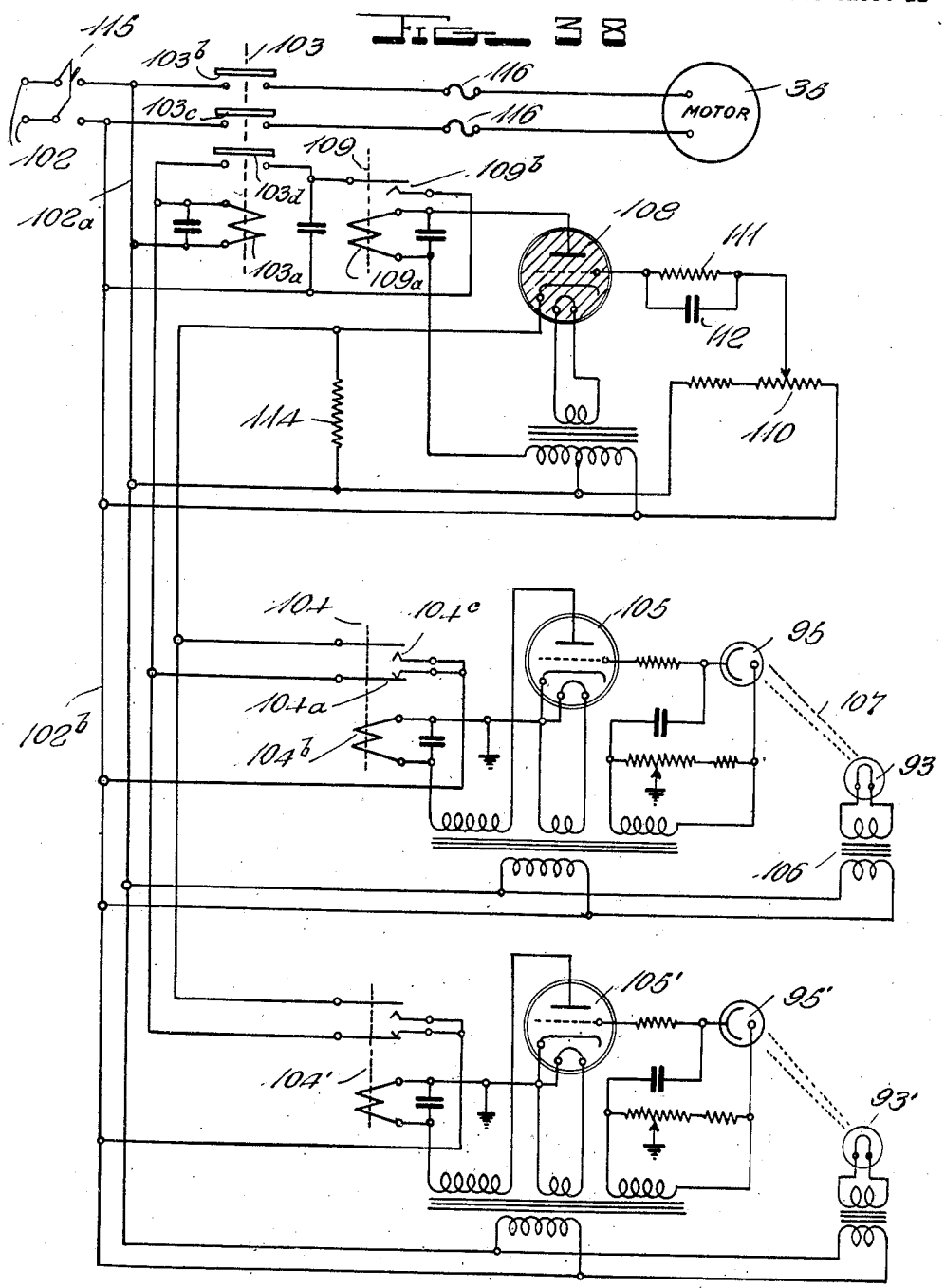

Patented Feb. 15, 1944

2,341,545

UNITED STATES PATENT OFFICE 2,341,545

ELECTRICALLY CONTROLLED OPERATING SYSTEM FOR REVOLVING DOORS

Thurloe M. Hagenbook, Evansville, Ind., assignor to International Steel Company, Evansville, Ind., a corporation of Indiana Application November 6, 1940, Serial No. 364,568

5 Claims. (Cl. 268—73)

My invention relates broadly to revolving doors and more particularly to a motor driven revolving door system with automatic control means for the driving motor.

One of the objects of my invention is to provide a construction of trolley apparatus including an electric motor for rotating a revolving door.

Another object of my invention is to provide a combination of clutch means for connecting an electric motor with the central shaft of a revolving door.

A further object of my invention is to provide in particular a friction clutch in the connection of a motor with a revolving door for permitting operation of the motor independently of the revolving door should the door become jammed.

Still another object of my invention is to provide an overrunning clutch in the connection between a motor and a revolving door for permitting manual operation of the revolving door independently of the driving motor.

A still further object of my invention is to provide a motor driven revolving door system in which the motor driving means is combined with the trolley structure which supports a revolving door.

Another object of my invention is to provide a motor driven revolving door system and electric circuit control means for automatically controlling the driving motor.

A further object of my invention is to provide radiant energy control means for a motor driven revoling door system and electric circuit control means energized from the radiant energy control means and including a time delay circuit for effectively regulating the operation of the driving motor.

Still another object of my invention is to provide radiant energy control means disposed in relation to a motor driven revolving door assembly, so that persons passing through the revolving door may control the automatic operation of the revolving door through the radiant energy control means; and further to provide a novel arrangement of means for mounting the radiant energy control means.

Other and further objects of my invention reside in the apparatus and control system, hereinafter described in more detail with reference to the accompanying drawings, in which:

Figure 1 is a view in elevation of a revolving door assembly showing the location of radiant energy control means at the doorway opening; Fig. 2 is a horizontal cross sectional view of the revolving door assembly taken on line 2—2 of Fig. 1; Fig. 3 is an enlarged vertical sectional view of the upper portion of the revolving door assembly showing the trolley mechanism in elevation; Fig. 4 is a vertical longitudinal sectional view with parts in elevation of a trolley mechanism; Fig. 5 is a vertical sectional view of the trolley mechanism taken on line 5—5 in Fig. 4; Fig. 6 is a vertical sectional view taken on line 6—6 in Fig. 4; Fig. 7 is a vertical sectional view of the trolley mechanism taken on line 7—7 in Fig. 4; Fig. 8 is a plan view of the trolley mechanism with the driving motor removed; Fig. 9 is a plan view of the overrunning clutch assembly connected with the main shaft of the revolving door; Fig. 10 is a plan view of the inner clutch member of the overrunning clutch assembly; Fig. 11 is a sectional view of the inner clutch member taken on line 11—11 in Fig. 10; Fig. 12 is a plan view of a header member which is fixed to the revolving door shaft; Fig. 13 is a sectional view taken on line 13—13 in Fig. 12; Fig. 14 is a detailed sectional view taken on line 14—14 in Fig. 9; Fig. 15 is a plan view of the cover for the casing of the trolley mechanism; Fig. 16 is a longitudinal sectional view taken on line 16—16 in Fig. 15; Fig. 17 is a cross sectional view taken on lines 17—17 in Figs. 15 and 16; Fig. 18 is a plan view of the casing of the trolley mechanism; Fig. 19 is a partial vertical sectional view taken on line 19—19 in Fig. 18; Fig. 20 is a partial cross sectional view taken on line 20—20 in Fig. 18; Fig. 21 is a cross sectional view taken on line 21—21 in Fig. 18; Fig. 22 is a partial bottom plan view of the casing of the trolley mechanism; Fig. 23 is a side elevational view of means for mounting a source of radiant energy in combination with a revolving door assembly; Fig. 24 is a vertical cross sectional view of the mounting means shown in Fig. 23; Fig. 25 is a vertical sectional view taken on line 25—25 in Fig. 24; Fig. 26 is a horizontal cross sectional view taken on line 26—26 of Fig. 24; Fig. 27 is a cross sectional view taken on line 27—27 in Fig. 24; Fig. 28 is a cross sectional view of the radiant energy mounting means taken on line 28—28 in Fig. 24; Fig. 29 is a detailed view of the parts of a secondary casing included in the radiant energy mounting means of Fig. 23; Fig. 30 is a plan view of mounting means for a radiant energy detecting device cooperable with the source of radiant energy supported as shown in Fig. 24; Fig. 31 is a horizontal sectional view of the mounting means shown in Fig. 30; Fig. 32 is a longitudinal sectional view taken on line 32—32 in Fig. 31; Fig. 33 is a cross sectional view taken on line 33—33 in Fig. 31;

Fig. 34 is a cross sectional view taken on line 34—34 in Fig. 31; Fig. 35 is a cross sectional view taken on line 35—35 in Fig. 31; Fig. 36 is a detailed sectional view of a cover member included in the mounting means of Fig. 30; Fig. 37 is a detailed sectional view of a bushing member included in the mounting means of Fig. 30; Fig. 38 is a schematic diagram of the circuit connections of the motor control system for automatically controlling the driving motor of the revolving door through the radiant energy control means.

My invention is directed to a motor driven revolving door system whereby the revolving door may be started and stopped automatically under the control of any person approaching the revolving door and intercepting a beam of energy for effecting operation of the revolving door. My invention contemplates many arrangements of energy beams with respect to the principal layout of the revolving door. I may employ a light source in combination with a photoelectric cell, or I may employ an emitter of infra-red rays in combination with an infra-red ray detecting device for controlling the circuits and mechanism for operating the revolving door. In certain installations of the system of my invention I locate the light source or infra-red ray emitter adjacent the floor at the entrance side of the revolving door and arrange the photoelectric cell or infra-red ray detector with respect to the light source or infra-red ray emitter in such position that persons approaching the entrance of the revolving door intercept the light beam or the energy beams of infra-red rays.

The photoelectric cell or infra-red ray detector is connected in a control circuit having a number of special features. The photoelectric cells or infra-red ray detectors on opposite sides of the revolving door each connect with the input circuit of an electron tube amplifier provided with relay means for controlling a motor starting relay and the circuits of an adjustable timer adapted to operate after a predetermined period corresponding to a desired cycle of operation of the revolving door. The control relay that responds to the operation of the adjustable timer releases the starting relay and opens the circuit to the driving motor which has high torque and minimum electrical and mechanical lag. The motor drives a speed reducer whose slow speed shaft connects with a combination friction and overrunning clutch system and the driving gear mechanism which operates the revolving door assembly.

There are a number of special features involved in the combination clutch system employed as it is essential that the clutch system operates positively in accordance with control impulses received from the photoelectric cell or infra-red ray detector. The revolving door is capable of being operated automatically by the driving motor and/or manually in the event that the photoelectric cell or infra-red ray detector control circuit may be disconnected or fail to respond. This automatic and/or manual operation is accomplished by providing an overrunning clutch which when driven from the motor mechanism imparts movement to the revolving door but allows the revolving door to be manually rotated without imparting any motion to the driving mechanism. And in combination with the overrunning clutch, I provide a friction clutch which prevents injury to persons and property and the mechanism of the door itself by allowing slippage in the automatic driving system should the door become jammed for any reason. The overrunning clutch permits operation of the door when the driving motor is inoperative, whereas the friction clutch permits operation of the driving motor when the door is jammed; for maximum efficiency, therefore, the overrunning clutch is connected with the revolving door shaft, and the friction clutch with the shaft of the driving motor.

Referring to the drawings in more detail, Fig. 1 is an exterior view of the revolving door assembly with the wall of a building indicated at 1, and the revolving door wings at 2. As indicated in Fig. 2, the door is arranged to rotate in the conventional counter-clockwise direction and persons therefore enter the revolving door substantially as indicated by arrow 3, that is at the right of the doorway opening. A corresponding condition exists at the inside approach to the revolving door where persons enter substantially as indicated by arrow 4. I take advantage of this circumstance to assure operation of the revolving door automatically by any person following arrows 3 or 4, by positioning a source of radiant energy in mounting means indicated generally at 5, adjacent the floor, and radiant energy detecting means indicated generally at 6, adjacent the upper portion of the revolving door. The source at 5 is arranged to direct radiant energy diagonally upward from its position adjacent the floor to the detecting means at 6 along the line indicated by arrows 7, which as indicated in Fig. 1, is necessarily crossed by any person entering the revolving door. The corresponding source at 5' and detecting means at 6' at the opposite side of the revolving door are similarly arranged as shown in Fig. 2 with the source 5' adjacent the floor beside the line of approach indicated at 4.

The trolley mechanism indicated generally at 8 in Fig. 1 is shown in more detail in Fig. 3 as an assembly movable from a central position in which the revolving doors may be rotated to a position at the side of the revolving door drum, indicated at 9, when the revolving doors are folded. I may provide any suitable supporting means for the wings 2 of the revolving door to permit the door wings to be folded. The supporting means are shown generally at 10 in Figs. 1 and 3, and are preferably of the type shown in Patent 2,081,774, issued to John W. Shields on May 25, 1937, for Revolving door mechanism.

The revolving door is maintained in central operative position by means of a bar and socket arrangement comprising a bar 11 which is pivoted at 12 on the trolley mechanism and engageable in a socket formed in a fixed member 14. The bar 11 is adapted to be raised out of engagement with the socket in member 14 by operation of a rod 15, by manual means 16. Upon release of bar 11 and the folding of wings 2 into collapsed position, the trolley mechanism may be moved to the side of the revolving door drum 9, where the bar 11 may be seated in a socket in member 17 which corresponds to member 14 for maintaining the doors in inoperative position. Adjustable abutment means at 18 assures alignment of bar 11 with the socket in member 17, and similarly adjustable abutment means 19 determines the proper position for engagement of bar 11, in the socket in member 14. Slot 20 in the ceiling 21 of the revolving door drum accommodates the shaft of the revolving door in its movement from operative to inoperative position.

Reference character 35, Figs. 3–5, designates a capacitor type induction motor, provided with condenser 36, and I have indicated terminal block 37 mounted on the motor casing for establishing connection through cable 38 with the external control circuits. The motor 35 is supported on the casing of the motorized speed reducer 39 which is in turn supported by casing 40 terminating in a flange 41 which is supported upon the mounting plate 42 in the trolley assembly.

The clutch system and driving mechanism are enclosed within casing 43 which carries journaling members 44 thereon on which rollers 45 are mounted. Rollers 45 are guided on tracks 46, Fig. 3, extending diametrically of the ceiling structure of the revolving door drum. The tracks 46 are formed from plates 47 anchored at opposite ends and spaced to allow travel of the trolley casing 43 from substantially the center of the revolving door drum to one side thereof when the revolving door is taken out of service and the wings folded with respect to each other. The motorized speed reducing unit 39 drives shaft 48 on which the clutch member 49 is slidably keyed. Clutch member 49 has a recessed face 50 into which the clutch face 51 of the coacting clutch member 52 is adapted to enter with the lining of woven cotton fabric 53 interposed. The layer of woven fabric 53 is supported upon the upwardly projecting central hub 54 which is adapted to extend into an annular recess 55 in clutch member 49.

Plate 52 is permanently keyed by means of key and keyway 56 to the shaft 57 which carries the gear 58. The shaft 57 is journaled in ball bearing raceway 59 mounted in the bearing retainer 60 which is in turn supported interiorly of casing 43. The shaft 48 which carries clutch member 49 is mounted in alignment with shaft 57 by the coaction of hub 54 and recess 55 and of the downwardly extending skirt or flange of member 49 with plate 52. The ball bearing raceway 62 which surrounds the hub portion of member 49 serves as a thrust bearing to control the amount of friction initially or normally interposed between member 49 and plate 52. Referring to Fig. 5, the ball raceway 62 is disposed in a recess 63 in transversely extending plate member 64. The transversely extending plate member 64 is apertured at opposite ends thereof as represented at 65. An adjusting stud 66 is screw threaded into the adaptor plate 42 and is adjustable therein to move the extension 66a of the stud through the apertures 65 in transversely extending plate 64. Springs 67 are concentrically arranged about the extensions 66a and bear upon the upper surface of the transversely extending plate 64. The spring 67 bears upon the shoulder of the adjustable stud 66 enabling tension in spring 67 to be varied. Accordingly, by adjusting each stud 66 the frictional pressure of member 49 with respect to the fabric lining 53 and plate 52 may be variably controlled. This permits a precision adjustment of the operation of the revolving door mechanism which is so essential under the conditions brought about by automatic control from the photoelectric or infra-red ray detector control system. This insures the making of the door safe so that even though a person might be caught in the revolving door, no bodily injury is likely to occur.

The driving force from motor 35 is transmitted through shaft 48, the friction clutch 49—53, and gear 58, Figs. 4 and 5, to gear 70 which is carried by pinion shaft 71. Pinion shaft 71, Figs. 4 and 7, carries pinion 72 and is journaled in ball bearing races indicated at 73 and 74. The ball bearing race 73 is mounted in a recess in bearing carrier 75 secured to the cover plate 43a of casing 43. The ball bearing race 74 is mounted in recess 76 in bearing retainer 60. The pinion 72 meshes with gear 77 which is provided with an upstanding hub portion 78 recessed to receive steel bushing 79 against which the diametrically opposed rollers 80 may operate in wedging relation, Figs. 4 and 9. The rollers 80 are urged into contact with bushing 79 by springs 93, Figs. 9 and 14, and mounted in recesses 81 arranged in diametrically opposed relationship in the carrier 82 forming the inner portion of the assembly which constitutes an overrunning clutch.

I provide a bearing, Figs. 4 and 6, for mounting the supporting member 82 and the rollers 80 associated therewith comprising a laminated arrangement of annular members 83 and 84 formed from self-oiling bronze and an intermediate member 85 formed from steel, all of the annular members being finished very smooth to eliminate bearing friction as much as possible. This assembly serves as a thrust bearing which avoids spinning of the door and yet permits controlled rotation thereof. The shaft of the revolving door is indicated at 86 passing through aperture 43b in casing 43 and extending into the header device 87. The header device 87 is rigidly keyed to shaft 86 through any suitable means indicated generally at 88, and disposed for universal movement in supporting member 82. The connection of header device 87 and supporting member 82 is a ball and socket type with header 87 being provided with projecting lugs 89 extending into slots 90 in the supporting member for transmitting the rotative force to the shaft 86. Lugs 89 do not rest in the bottom of slots 90, as indicated in Fig. 6, but are free to move in slots 90 as the ball header 87 is inclined with respect to socket member 82 during rotation of shaft 86, in accommodating any slight axial misalignment of the revolving door shaft. A ball race thrust bearing 91 is disposed between casing 43 and an annular recess 92 in gear 77, and serves to support substantially the entire weight of the revolving door and as a journal for gear 77.

Referring to Figs. 5 and 8, the transversely extending plate member 64 which connects with the thrust bearing 62, is shown as having laterally extended wing portions in which the apertures 65 are formed for engagement by the studs 66. By this arrangement, the studs 66 are conveniently located for adjustment from outside the trolley mechanism without disturbing any of the component parts.

The casing 43 of the trolley mechanism is of one piece cast construction substantially as shown in Figs. 18–22, with its principal feature being an integral upstanding collar portion 22 which serves for securely mounting the thrust bearing 91 and is of sufficient diameter to receive a tubular extension 23, Figs. 3 and 4, the inner diameter of which is sufficient to permit operation of the ball and socket type connection by which shaft 86 is supported. Figs. 15–17 illustrate the cover 43a of the casing 43, which has as an integral part thereof, an abutment 24 adjacent the upstanding lug portion 25 to act as stop for the bar member 11, which is pivoted in the lug 25.

The mounting means for the source of radiant energy, shown generally at 5, 5', Figs. 1 and 2, is shown in detail in Figs. 23–29 as comprising a fixed casing 26, having a flanged supporting base 27 which is secured to the foundation, and a secondary casing 28 provided with a cover 28a and mounted in the fixed casing 26. As shown more clearly in Fig. 24, the secondary casing 28 has arcuate upper and lower walls described about the center of pivotal supports at 29. The source of radiant energy is shown as an electric lamp 93 mounted in fixed relation to the cover 28a, and a projection lens system is provided at 30 mounted in the cover 28a for cooperation with lamp 93 to direct a beam of light energy diagonally upward from the mounting means.

The angle of inclination of the light beam is determined by movement of the secondary casing 28 on the pivotal supports at 29, and fixed in determined relationship for a given installation by bolt means indicated at 31. As the exact position of the secondary casing 28 is indeterminable prior to actual installation of the apparatus, I prefer that the openings for the bolt means 30, in both the fixed casing 26 and the secondary casing 28 be not drilled until final adjustment of the inner casing 28 for proper direction of the light is decided upon; it will be understood, however, that any equivalent adjustable locking means may be provided in lieu of the bolt means 31. Electrical connection is made to lamp 93 by conductor means 32 which may be conveniently led upward through the foundation and the supporting base 27, thence through an opening 26a in the fixed casing 26 to lamp 93 in the secondary casing 28, the back of the secondary casing being open, as shown. Ventilation may be provided in the mounting means, as by apertures 33 in the upper portion and openings 34 in the bottom of fixed casing 26.

The mounting means for the radiant energy detecting device, shown generally at 6, 6', Figs. 1 and 2, is shown in detail in Figs. 30-37 as comprising a bushing member 96 forming a socket for receiving the base 95a of the detecting device 95, and having a fixed support such as the pipe at 97. The bushing member 96 is secured to the fixed support 97 by screw means 98 extending through a flange portion 96a of the bushing member. A cover 99 for the detecting device 95 is mounted by screw means 100 on the bushing member 96 and is provided with an extended tubular portion 99a opening in the direction of the source of radiant energy. The remainder of the cover 99 shields the detecting device from radiant energy incident from other directions. In the embodiment shown and described, the detecting means 95 is a photoelectric cell cooperable with the electric lamp source of light rays, shown at 93, Fig. 24. Connection is made to the photoelectric cell through conductor 101.

The electric circuit control system by which the radiant energy control means are employed is shown schematically in Fig. 38, with motor 35 and the radiant energy source 93 and coacting detecting device 95 energized from a common source of power connected at 102. Motor 35 is connected with the source at 102 through motor control relay switch means 103 comprising relay winding 103a and switch means 103b and 103c connected in the motor circuit; additional switch means 103d are provided and connected in a holding circuit for the relay winding 103a.

The relay winding 103a is connected at one side with line 102a and its circuit is completed through control contacts 104a of a control relay 104, back to line 102b. The actuating winding 104b of the control relay 104 is energized through the anode-cathode path of an electron tube 105 which has a control grid normally biased at operating potential by connection to the cathode of photoelectric cell 95. The light source 93 is energized through transformer 106 from the source of power at 102 and normally supplies radiant energy to the photoelectric cell 95 by which the operating potential on tube 105 is maintained; interruption of the light beam, indicated at 107, leaves photoelectric cell 95 unactivated whereupon the tube 105 assumes a cut-off grid potential and becomes nonconductive to deenergize the relay winding 104b.

In addition to contacts 104a, operated upon deenergization of relay winding 104b for actuating relay switch means 103, contacts 104c also are effective for initiating operation of timing means adapted to terminate the operation of the motor 35 which was initiated by the relay switch means 103. The timing means shown comprises a thyratron tube 108 having the actuating winding 109a of a control relay 109 connected in its anode-cathode circuit; contacts 109b of the relay are connected in series with switch means 103d as a holding circuit for relay winding 103a, switch means 103d being closed so long as the relay winding is energized and contacts 109b being closed so long as tube 108 is conductive. The thyratron tube circuits include a grid biasing circuit including potentiometer means 110 and a series resistor 111 shunted by condenser 112 for maintaining an adjustable bias on the tube to regulate the time constant of the circuit.

The thyratron 108 is fired by the application of suitable voltage to the cathode thereof simultaneously with operation of the relay switch means 103. Ballast resistor 114 is connected between the thyratron cathode and line 102a, and appears in shunt across lines 102a and 102b when contacts 104c are closed. The effect of opening contacts 104c, therefore, may also be viewed as a change in the relative potential of the grid with respect to the cathode which results in firing of the tube and operation of control relay 109 to establish the holding circuit for relay winding 103a. The deionization period of the thyratron tube 108 thus determines the duration of operation of motor 35, after operation of the control relay 104, as relay 109 is energized and relay switch means 103 is operated only so long then as the tube 108 is conductive. Upon release of relay 109, the holding circuit to relay winding 103a is opened and the switch means 103b—c disconnects the motor 35 from the power source at 102.

A master control switch for the electric circuit control means is provided at 115 in the connection from the power source at 102 to lines 102a and 102b; and overload fuse means 116 are inserted in each connection to the motor 35. Duplicate radiant energy control means, including light source 93', photoelectric cell 95', electron tube 105' and a control relay 104' are connected similarly as the like means already described, with respect to the lines 102a—b, relay winding 103a and the timing means. The dual control means are arranged on opposite sides of the revolving door for automatic operation of the revolving door as persons enter from either side. The energy supplied to the photoelectric control means and the thyratron timing means is alternating current and no rectification is required. The control and timing circuits in themselves are of known form, and various equivalent arrangements may be employed; but the cooperable relationship in the combination of radiant energy control means, timing means and relay switch means for automatically regulating the operation of a motor driven revolving door is considered a part of my invention.

The operation may be summarized as follows. Upon a person's entering the revolving door at one side, light beam 107 is interrupted and relay winding 104b is deenergized to close the circuit to the relay winding 103a and open the circuit that placed resistor 114 in shunt across the lines 102a—b. Relay 103 then operates to close the main circuit to motor 35, starting its operation, and the timing means is set in operation to maintain the holding circuit on relay 103 for the duration of a predetermined time period, after which the timing means releases the relay 103 and terminates the operation of motor 35.

A similar procedure takes place when the other set of control means is actuated by a person entering the revolving door from the opposite sides. Due, however, to the diagonal arrangement of the light beams, which places them generally above the fields of movement of persons leaving the revolving door, the sequence of operation is ordinarily not repeated by the same person after his passage through the doorway. Persons in succession entering the door at either side repeatedly operate the control means and delay the deionization of the thyratron tube so that relay 103 is not allowed to release until the last person has passed out of the door and the time period of the thyratron device, initiated by the movement of the last person across one or the other of the light beams, has run.

While I have disclosed my invention in a preferred form, I desire it understood that modifications may be made in the form and arrangement of the various elements, including the revolving door construction and the control and operating means, within the scope of the following claims.

What I claim as new and desire to secure by Letters Patent of the United States is as follows:

1. A gear drive for a revolving door system, comprising a casing having a base aperture and a cover aperture off-set in relation to said base aperture, a revolving door shaft extending upward through said base aperture, means for mounting said shaft for rotation with respect to said casing, an electric motor mounted on said casing above said cover aperture with the shaft of said motor extending downward through said cover aperture, and means within said casing for connecting said motor shaft with said revolving door shaft including a pair of coacting clutch members for transmitting motive power to the revolving door.

2. A gear drive for a revolving door system, comprising a casing having a base aperture and a relatively off-set cover aperture, a revolving door shaft extending upward through said base aperture, means for mounting said shaft for rotation with respect to said casing including overrunning clutch means in connection with said shaft and a driving member, with a thrust bearing disposed between said driving member and said casing, an electric motor mounted on said casing above said cover aperture with the shaft of said motor extending downwardly through said cover aperture, and means within said casing including a friction clutch device for connecting said motor shaft with said driving member for transmitting motive power through said overrunning clutch means to said revolving door shaft.

3. A gear drive for a revolving door system, comprising a casing having a base aperture and a relatively off-set cover aperture, a revolving door shaft extending upward through said base aperture, means for mounting said shaft for rotation with respect to said casing, an electric motor mounted on said casing above said cover aperture with the shaft of said motor extending downward through said cover aperture, friction clutch means mounted in said casing in coaxial relation to said motor shaft and including driving and driven members and a thrust bearing disposed between said driving member and said casing, and means within said casing including an overrunning clutch device for connecting said driven member with said revolving door shaft for transmitting motive power to the revolving door.

4. A gear drive for a revolving door system, as set forth in claim 3 wherein the thrust bearing in said friction clutch means is provided with mounting means adjustable from outside said casing for varying the contact pressure between said driving and driven members.

5. A gear drive for a revolving door system, comprising a casing having a base aperture and a relatively off-set cover aperture, a revolving door shaft extending upward through said base aperture, means for mounting said shaft for rotation with respect to said casing including overrunning clutch means in connection with said shaft and a driving member, with a thrust bearing disposed between said driving member and said casing, an electric motor mounted on said casing above said cover aperture with the shaft of said motor extending downward through said cover aperture, friction clutch means mounted in said casing in coaxial relation to said motor shaft and including driving and driven members and a thrust bearing disposed between the last said driving member and said casing, and means within said casing for positively connecting said driven member with the first said driving member for transmitting motive power through said friction clutch means and said overrunning clutch means to said revolving door shaft.

THURLOE M. HAGENBOOK.